United States Patent
Olsen et al.

[11] Patent Number: 6,137,479
[45] Date of Patent: *Oct. 24, 2000

[54] PROGRAMMABLE COMPUTER POINTING DEVICE

[75] Inventors: Anette Olsen; Fred Olsen, both of Oslo, Norway

[73] Assignee: Timex Corporation, Middlebury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/985,587

[22] Filed: Dec. 5, 1997

[51] Int. Cl.$^7$ ....................................................... G09G 5/00
[52] U.S. Cl. .......................... 345/169; 345/156; 345/158; 345/168
[58] Field of Search ................................ 345/2, 163, 164, 345/165, 166, 167, 168, 169, 156, 157, 158, 121

[56] References Cited

U.S. PATENT DOCUMENTS

| | | |
|---|---|---|
| 4,369,439 | 1/1983 | Broos . |
| 4,534,012 | 8/1985 | Yokozawa ................................ 364/900 |
| 4,661,659 | 4/1987 | Nishimura ................................ 345/164 |
| 4,751,741 | 6/1988 | Mochinaga et al. . |
| 4,853,682 | 8/1989 | Asano et al. ............................. 345/157 |
| 4,856,077 | 8/1989 | Rothfjell . |
| 4,913,573 | 4/1990 | Retter . |
| 4,917,516 | 4/1990 | Retter . |
| 4,922,236 | 5/1990 | Heady . |
| 4,994,795 | 2/1991 | MacKenzie . |
| 5,063,376 | 11/1991 | Chang . |
| 5,088,070 | 2/1992 | Shiff ....................................... 345/156 |
| 5,274,363 | 12/1993 | Koved et al. .............................. 345/2 |
| 5,281,958 | 1/1994 | Ashmun et al. ......................... 345/157 |
| 5,294,792 | 3/1994 | Lewis et al. . |
| 5,428,369 | 6/1995 | Pranger et al. . |
| 5,457,480 | 10/1995 | White ..................................... 345/163 |
| 5,563,631 | 10/1996 | Masunaga ................................ 345/169 |
| 5,714,972 | 2/1998 | Tanaka et al. ........................... 345/121 |
| 5,801,664 | 9/1998 | Seidensticker et al. ..................... 345/2 |
| 5,815,127 | 9/1998 | Jacobs et al. .............................. 345/2 |
| 5,943,625 | 8/1999 | Yeom et al. ............................. 345/157 |

*Primary Examiner*—Steven J. Saras
*Assistant Examiner*—Alecia D. Nelson
*Attorney, Agent, or Firm*—Carmody & Torrance LLP

[57] ABSTRACT

A processor-based computer pointing device includes a keypad, a display and data memory. The pointing device includes traditional computer mouse components to position a cursor displayed on a computer display screen and select items displayed on the screen. The pointing device provides data organizer and timekeeping functions and can be programmed to control other devices. Data interfaces are provided for transferring data between the pointing device and other devices.

16 Claims, 6 Drawing Sheets

PROGRAMMABLE COMPUTER POINTING DEVICE

BACKGROUND OF THE INVENTION

The present invention relates to a programmable computer pointing device and more specifically to a processor-based portable computer mouse with a keypad and a display.

Most modern computer systems include some form of graphical user interface. A computer user operates such computers by selecting items (e.g., icons) displayed on the computer's display screen. Traditionally, the user employs a computer pointing device to move a cursor displayed on the computer's display screen and select the items displayed on the screen.

A very popular computer pointing device is the so-called computer mouse. A user moves the cursor on the display screen by moving the computer mouse over a surface. A motion sensor in the computer mouse detects the movement of the computer mouse and sends signals to the computer that indicate the direction and the distance the computer mouse moved. The computer processes these signals to position the cursor on the display screen.

To perform an operation associated with an item displayed on the display screen, the user depresses a switch located on the computer mouse. This causes the computer mouse to send another signal to the computer. The computer processes this signal to perform the selected operation.

Traditionally, the functionality of the computer mouse has been limited to control and data entry operations. However, because a computer mouse is a relatively indispensable item for many computer users, the computer mouse would be more useful if it performed additional functions.

Many computer users also use devices that allow them to access the same data file on more than one computer or other electronic device. Frequently, a person maintains information such as a phone number directory on an office computer but needs access to the information when travelling. In addition, it is often desirable to transfer the information to other computers. Some portable devices such as electronic address books and appointment books can transfer data between the device and a computer. However, this method of transferring data between computers may be undesirable because a person would have to purchase a portable device he or she might not otherwise need. Moreover, these devices typically are relatively bulky and often must be used with additional electronic devices to transfer data to and from the computer.

A watch device sold by Timex Corporation under the name "DATA LINK" receives data from a computer without using an additional electronic device. The watch uses an optical sensor to detect changes in the image displayed on a computer display screen. The changes in the displayed image define the data transferred to the watch. In its current configuration, the watch does not transmit data to the computer.

In view of the limitations of the devices discussed above, it is desirable to provide a portable device that conveniently and economically allows a person to access information stored in the device and transfers information between electronic devices.

SUMMARY OF THE INVENTION

A programmable computer pointing device provides a combined computer mouse and a portable programmable computer. A user controls a cursor and selects items on a remote computer's display screen by moving the pointing device and operating switches on the pointing device. Using a keypad and a display, the user controls the pointing device to perform programmed functions such as accessing information stored in the pointing device. Data ports are provided for transferring data between the pointing device and other devices.

The pointing device includes conventional computer mouse components for positioning the cursor on the display screen, selecting items on the display screen and sending signals to the remote computer. A motion sensor detects movement of the pointing device and generates signals that are processed by the remote computer to control the position of the cursor on the remote computer's display screen. One or more switches generate signals that are processed by the remote computer to initiate an operation on the remote computer such as selecting an icon on the display screen. These signals are sent to the remote computer through a data port that connects to the remote computer's mouse port.

The pointing device also includes many of the features and functions found in a portable computer. A user operates the processor-based pointing device using the keypad and display. As in a conventional computer, the user can run programs loaded into the pointing device and access data files stored in the pointing device's data memory.

The pointing device can be programmed to perform a variety of functions. For example, the pointing device can be programmed as a personal organizer for addresses, phone numbers, appointments and other information. In this case, the user uses the keypad and display to access and modify information stored in the pointing device's data memory.

Data is transferred between the pointing device and other devices through the pointing device's data ports. Thus, data such as the personal information discussed above can be transferred from the pointing device to the remote computer and vice versa. In addition, because the pointing device connects to the remote computer's mouse port, additional hardware components are not used to send data to the remote computer.

The present invention expands the functionality of a conventional computer mouse by adding a display, a keypad, a processor and data memory which enable a user to store, process and display information. Because the computer mouse is portable, a user can access the information stored in the pointing device when the pointing device is not connected to the remote computer. Thus, the user can access the information as he or she travels. In addition, because the pointing device can transfer data to other devices, the user will have access to the same data files when the user uses the computer mouse with another computer. Finally, because the pointing device is programmable, it can be configured to perform other functions. The pointing device can be used to control electronic devices such as televisions, security systems and garage doors through its communications ports.

In one embodiment of the present invention, computer mouse functions are incorporated into a watch. The pointing device has a display and controls like a conventional watch and a person wears it like a conventional watch. Motion sensors, switches and a computer mouse port interface are built into the watch to provide the computer mouse functions. To use the pointing device as a computer mouse, the person simply connects it to the remote computer's mouse port. This embodiment is particularly useful when the personal organizer function discussed above is included with the watch. Because a person can easily carry the watch, it provides convenient access to the personal information stored in the watch.

In another embodiment of the present invention, computer mouse components and programmable computer components are in separate housings. A computer mouse housing contains the components that perform the traditional computer mouse functions, namely, moving the cursor and selecting items on the display screen. The programmable computer housing contains the components that provide the user interface and processing functions. The housings include data ports for transferring data between the two housings. This embodiment provides a more conventional size computer mouse yet maintains the portability of the programmable computer component of the pointing device.

BRIEF DESCRIPTION OF THE DRAWINGS

These and other features of the invention may be more fully understood from the following detailed description, taken together with the accompanying drawings, wherein similar reference characters refer to similar elements throughout and in which.

DETAILED DESCRIPTION OF ILLUSTRATIVE EMBODIMENTS

Figure 1:
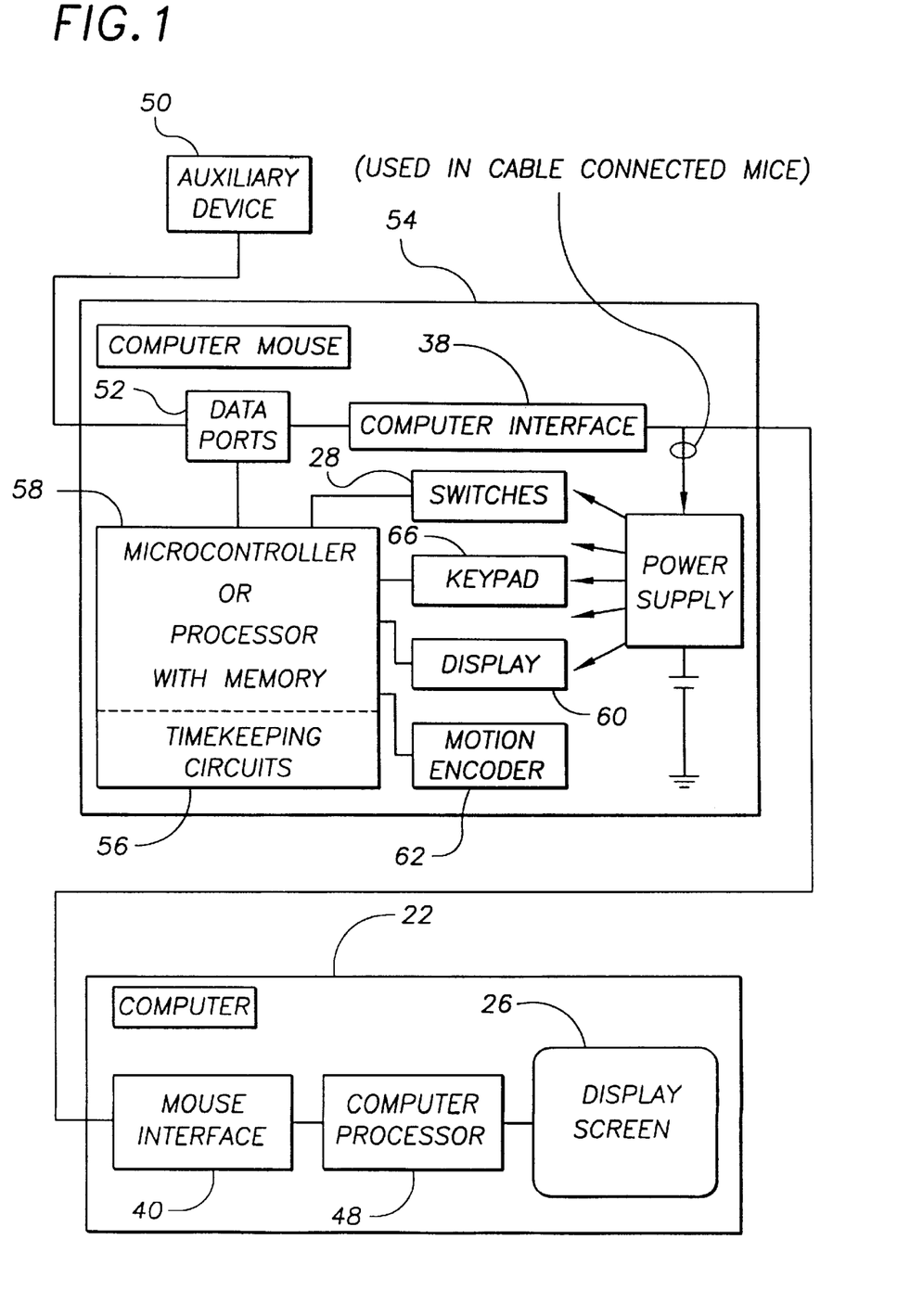
FIG. 1 is a block diagram of a programmable computer pointing device in accordance with the present invention.

Referring to FIG. 1, a programmable computer mouse 20 is connected to a computer 22. The computer mouse 20 includes conventional computer mouse components for using the computer's graphical user interface. A motion encoder 24 generates signals to control a cursor (not shown) displayed on a display screen 26. Switches 28 generate signals to select items displayed on the display screen 26. The computer mouse 20 also includes a computer circuit with a microcontroller 30, a display 34 and a keypad 36. A computer interface 38 and a mouse interface 40 transfer data and signals between the computer mouse 20 and the computer 22.

The motion encoder 24 includes a roller ball 42 (FIGS. 2A and 2B) mounted on the bottom of the computer mouse 20 to detect the movement of the computer mouse 20. The motion encoder 24 detects rotation of the roller ball 42 and generates signals that indicate the direction and distance the roller ball 42 moves.

Other types of motion sensors may be used in accordance with the present invention. For example, devices such as friction or pressure sensors or a top mounted track ball can control the position of the cursor on the display screen 26. Alternatively, the motion encoder 24 may use optical sensing components.

Figure 2A:
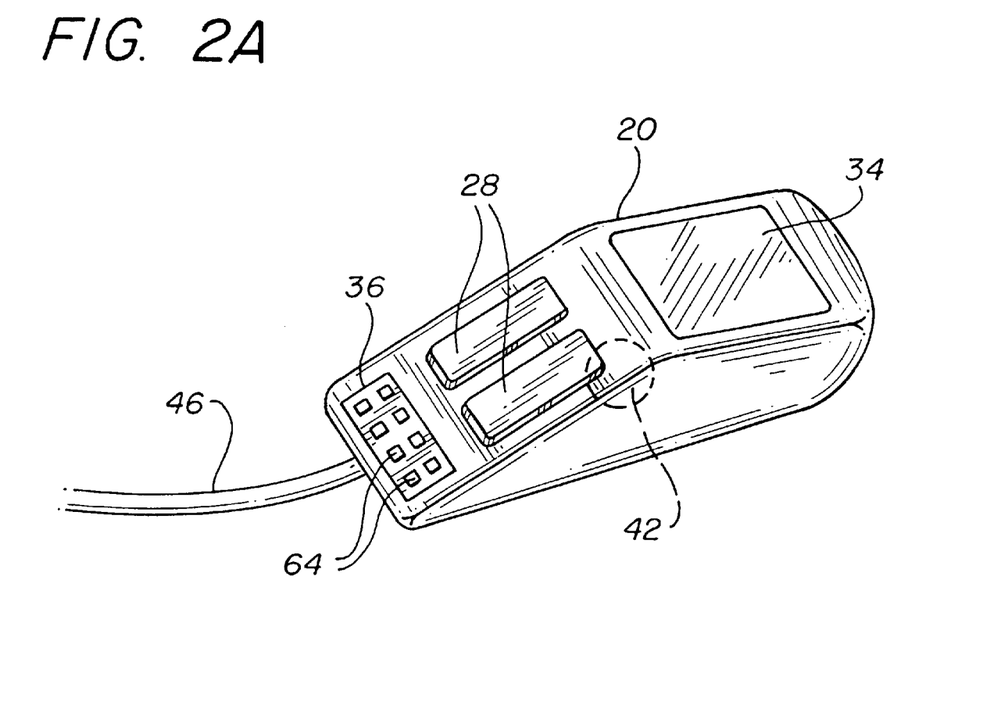
FIGS. 2A and 2B are a perspective view and a partial side and bottom view, respectively, of an exemplary embodiment of a programmable computer pointing device in accordance with the present invention.
Figure 2B:
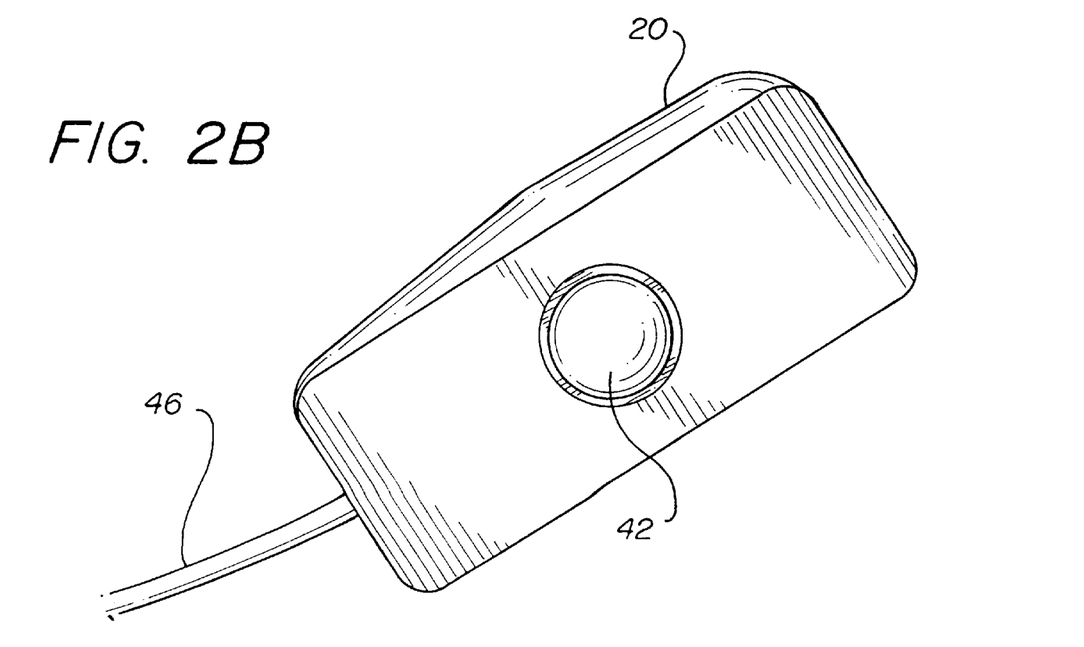

The signals generated by the motion encoder 24 are sent to the computer interface 38. The signals are then sent to the computer's mouse interface 40 over a line 44. Typically, the computer interface 38 and the mouse interface 40 are connected with wire conductors 46 (FIGS. 2A and 2B). However, they can be connected using infrared or radio frequency techniques. A computer processor 48 processes the motion sensor signals to control the position of the cursor on the display screen 26.

Switches 28 (FIGS. 1 and 2A) generate signals to initiate an operation associated with an item displayed on the display screen 26. For example, a user can select an icon on the display screen 26 by depressing the appropriate switch when the cursor is positioned over the icon. The signals generated by switches 28 are sent to the computer 22 through the computer interface 38 and mouse interface 40. In response to these signals, the computer processor 48 performs the corresponding operation.

The operation and construction of conventional computer pointing devices are well known in the computer art. Accordingly, these aspects of the present invention will not be discussed further.

The computer mouse 20 includes a computer that is programmed to provide various functions. Using the keypad 36 and the display 34, a user accesses information stored in the computer mouse 20, transfers data between the computer mouse 20 and other devices and controls auxiliary devices. The microcontroller 30 controls the operation of the computer mouse 20 by executing programs stored in a data memory (not shown) and responding to signals from the keypad 36.

In a preferred embodiment, the computer mouse 20 functions as a data organizer. A user stores information such as telephone numbers, addresses or appointments in the computer mouse 20 by entering the corresponding data on the keypad 36 or by transferring the information from the computer 22. When a user enters the appropriate strokes on the keypad 36 to display this information, the microcontroller 30 processes the input signals from the keypad 36 and accesses the appropriate data from the data memory. The microcontroller 30 processes the data stored in the data memory to generate display signals that drive the display 34.

Information stored in the computer mouse's data memory is transferred to and from the computer 22 through computer interface 38 and mouse interface 40. Typically, the physical connection between the computer mouse 20 and the computer 22 is made using wire conductors 46 (FIGS. 2A and 2B). Alternatively, wireless connections can be made using infrared or radio frequency transmitters and receivers in the computer interface 38 and the mouse interface 40.

In a preferred embodiment, the mouse interface 40 is the computer's mouse port. The computer mouse 20 sends data to the computer 22 using this connection. This configuration eliminates the need to provide additional hardware on the computer 22 for data transmitted from the computer mouse 20 to the computer 22. Another connection (e.g., the data connection provided by a Timex "DATA LINK" watch) can provide the path for data from the computer 22 to the computer mouse 20. To facilitate the transfer of data between the computer mouse 20 and the computer 22, appropriate software is installed on the computer 22. Similar software is installed in the computer mouse 20 and executed by the microcontroller 30.

The computer mouse 20 can be programmed to perform other functions such as controlling auxiliary devices. For example, the computer mouse 20 could function as a television remote control or a garage door opener.

The computer mouse 20 communicates with an auxiliary device 50 through one or more data ports 52. Typically, a data port 52 sends and receives data using infrared or radio frequency signals. The operation and construction of infrared and radio frequency transmitters and receivers for portable electronic devices are well known in the data communication art. Accordingly, these aspects of the present invention will not be discussed further.

The present embodiment is constructed using conventional electronic components. Thus, the microcontroller 30 includes a microprocessor with built in random-access memory, read-only memory and input/output ports. Alternatively, a microprocessor and a memory may be used instead of the microcontroller 30. Also, a custom device could be used for the microcontroller 30. The components selected for a particular application depend on the requirements of the application.

Data memory for the system may be provided using conventional memory components, the use of which is well known in the art. For example, an electrically-erasable programmable read-only memory could be used instead of the read-only memory to provide semi-permanent data memory storage.

The display 34 is mounted on the computer mouse 20 as depicted in FIG. 2A. The size of the display 34 depends on the dimensions of the computer mouse 20 and the amount and types of data images that are displayed. Typically, the display 34 is constructed of an LCD device, the use of which is well known in the art. Other applications may use segmented displays that display numeric or alpha-numeric characters. For graphics applications, a full dot matrix display may be used.

The keypad 36 contains several keys 64 as depicted in FIG. 2A. In some applications, only a few keys are provided. However, to support applications with more functionality, a keypad with several keys (e.g., number keys 0–9 or alpha-numeric keys) is used to control the pointing device and to input data directly into the computer mouse 20. Typically, the computer mouse switches 28 are separate from the keypad 36. However, in some applications, the keypad's keys 64 function as the computer mouse switches.

In an alternate embodiment of the present invention, the functions of a watch and a pointing device are combined in a single device. The device displays the time, the date and other timekeeping information on a display and provides the motion sensing capabilities and computer mouse keys of a conventional computer mouse. The device is adapted to be readily connected and disconnected to a wristband to facilitate using the device as either a wristwatch or a pointing device. An interface is provided to connect the device to a computer's mouse port when the device is used as a pointing device.

Figure 3:
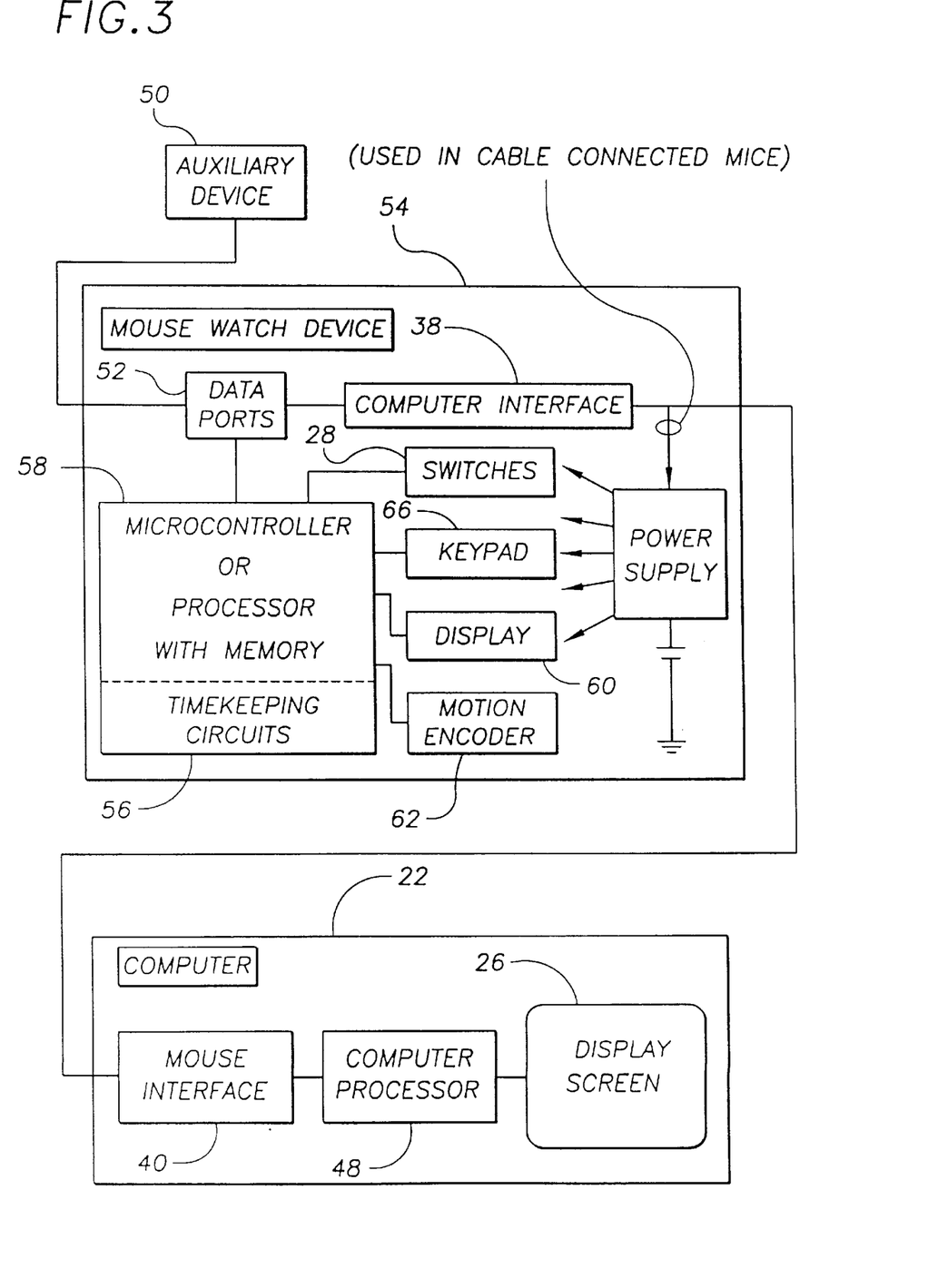
FIG. 3 is a block diagram of a computer mouse and watch combination in accordance with the present invention.

Referring to FIG. 3, a mouse watch device 54 contains a microcontroller 58 with a timekeeping circuit 56 to provide the timekeeping functions. The microcontroller 58 processes signals from a keypad 66 to perform operations such as setting the time and changing the format of the time and date displayed on a display 60. The microcontroller 58 can be programmed to provide additional common watch features including a stop watch, a calendar or a calculator. The operation and construction of conventional digital watches are well known in the watch art. Accordingly, these aspects of the present invention will not be discussed further.

Figure 4A:
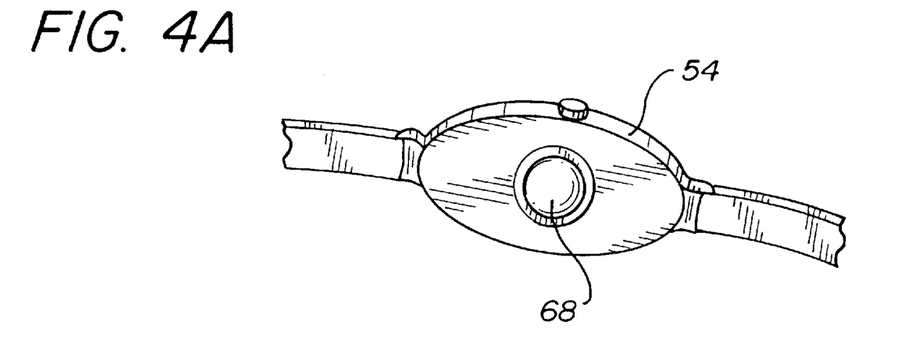
FIGS. 4A, 4B and 4C are exemplary embodiments of a computer mouse and watch combination in accordance with the present invention.

The motion encoder 62 detects translation, e.g., the movement of the mouse watch device 54 over a surface. In one embodiment, a roller ball 68 is mounted on the bottom of the mouse watch device 54 to detect its movement as it is rolled on a surface (FIG. 4A). In another embodiment, a track ball 70 (FIG. 4B) is mounted on the top of the watch and the track ball 70 is rotated to move the cursor on the display screen 26. In yet another embodiment, the watch includes a pressure sensor 72 (FIG. 4C) which, when pressed, generates signals indicative of the applied pressure. The pressure signals, in turn, are processed to generate signals which control the position of the cursor on the display screen 26. The basic operation and construction of conventional motion sensors are well known and widely used in the computer pointing device art. Accordingly, these aspects of the present invention will not be discussed further.

Figure 4B:
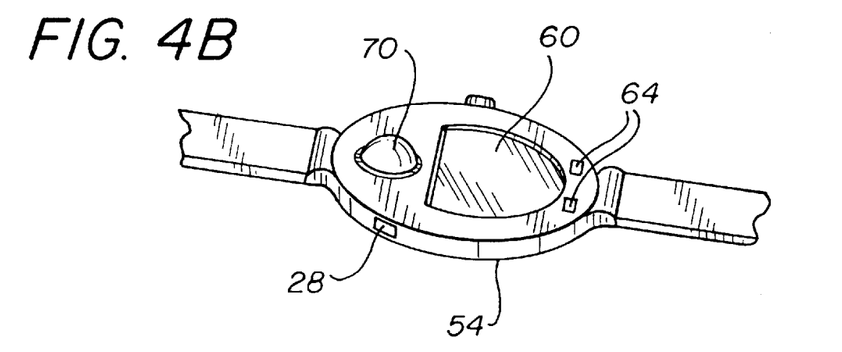
Figure 4C:
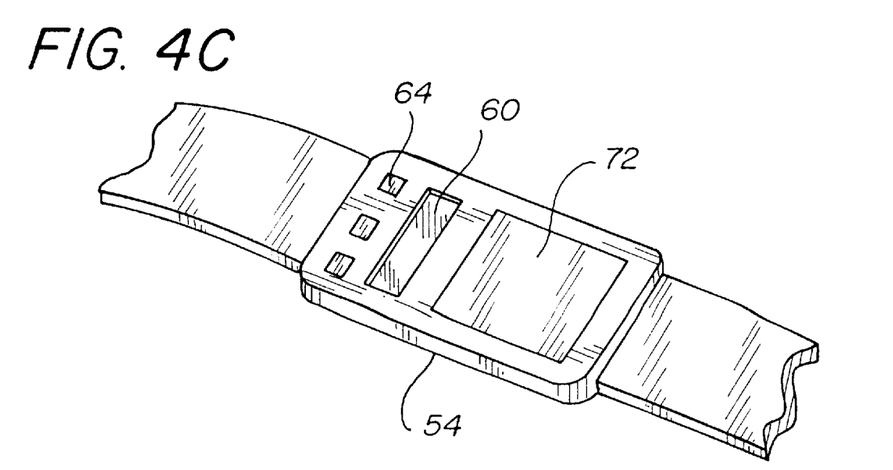

As depicted in FIGS. 2, 4B and 4C, the number and configuration of keys 64 depend on the particular application. For example, a basic watch would only need a few keys for setting the time. Alternatively, if the watch provides calculator capabilities, the keypad 66 would have keys for the numbers 0 through 9.

Figure 5:
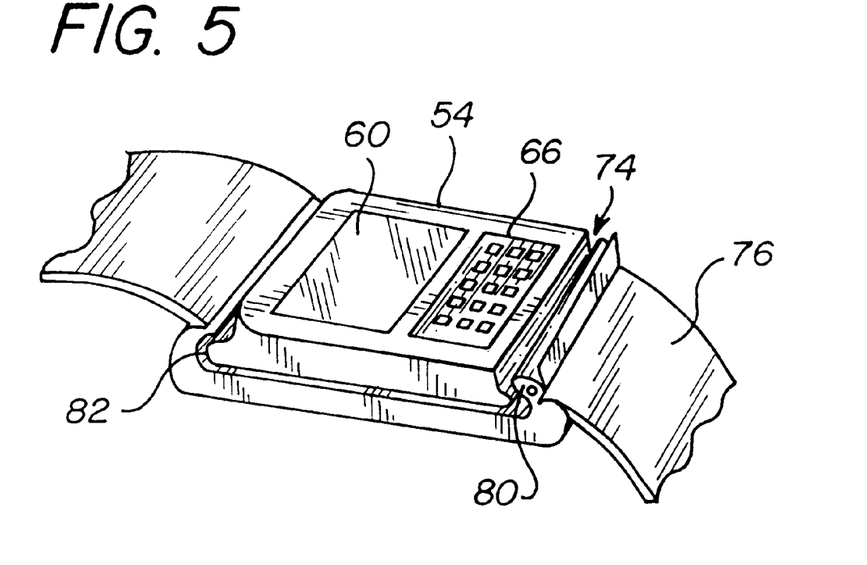
FIG. 5 is an exemplary embodiment of a releasable wristwatch coupler in accordance with the present invention.

The mouse watch device 54 includes a release mechanism 74 (FIG. 5) that detaches the pointing device from a wristband 76. In FIG. 5, the mouse watch device 54 is held in position by a spring-biased latch 80. The mouse watch device 54 fits into a seat 82 on one side of the wristband 76 and the latch 80 pivots to hold the other end of the mouse watch device 54 in place. Alternatively, a variety of mechanisms could be employed to attach the mouse watch device 54 to the wristband 76. For example, the mouse watch device 54 could snap into a seat in the wristband 76. The mouse watch device 54 could slide into a compartment in the wristband 76. Each of the two bands of the wristband 76 could connect to opposite ends of the mouse watch device 54.

Figure 6:
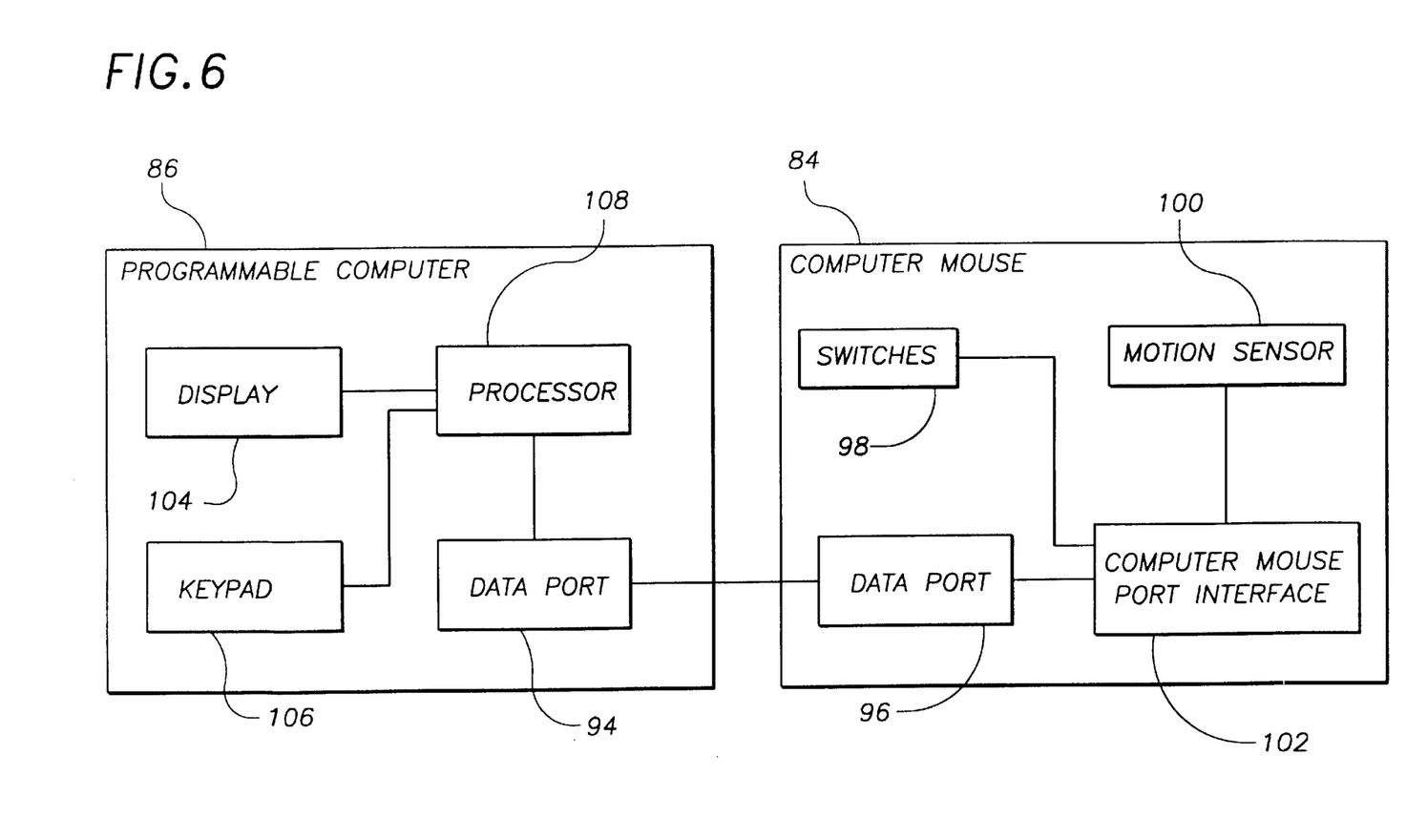
FIG. 6 is a block diagram of a computer mouse and a programmable computer in separate housings in accordance with the present invention.
Figure 7:
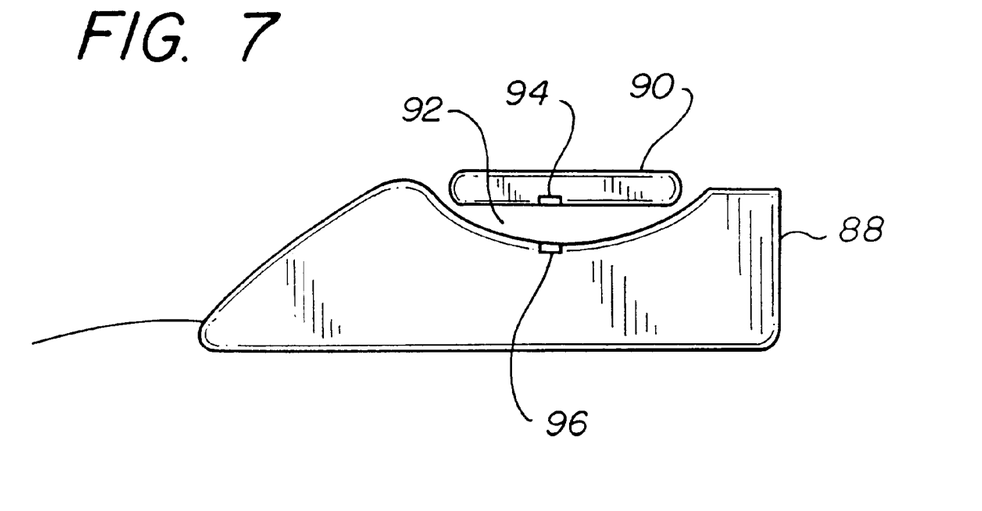
FIG. 7 is an exemplary embodiment of a computer mouse and a programmable computer in separate housings in accordance with the present invention.

In another embodiment of the present invention depicted in FIGS. 6 and 7, a computer mouse 84 and a programmable computer 86 are placed in separate housings. A computer mouse housing 88 contains the components that perform the traditional computer mouse functions (e.g., the computer mouse 84). A programmable computer housing 90 contains the programmable computer components (e.g., the programmable computer 86). The computer mouse housing 88 has a saddle 92 for coupling the programmable computer 86 to the computer mouse 84. Data ports 94 and 96 are provided for sending data between the computer mouse 84 and the programmable computer 86.

The computer mouse 84 includes switches 98, a motion sensor 100 and a computer mouse port interface 102 as discussed in the embodiments above. Typically, the computer mouse port interface 102 connects to the mouse interface 40 on the computer 22 (FIG. 1).

The programmable computer 86 has a display 104 and a keypad 106 along with a processor 108 and a data memory (not shown). In a preferred embodiment, the programmable computer 86 is a watch similar to the watch device discussed above. The programmable computer 86 could be very similar to a Timex "DATA LINK" watch with the addition of an optical transmitter to send data to an optical receiver in the computer mouse 84.

The computer mouse 84 and programmable computer 86 have data ports 94 and 96 that provide data paths for data flowing between the computer mouse 84 and the programmable computer 86. In essence, the computer mouse 84 provides an interface for downloading from the programmable computer 86 to the computer 22 and vice versa. The programmable computer 86 sends data from data port 94, the computer mouse's data port 96 receives the data and sends it through the computer mouse port interface 102 to the computer 22. Conversely, data from the mouse interface 40 on the computer 22 is received by the computer mouse port interface 102 and sent through the data ports 94 and 96 to the programmable computer 86. The computer mouse 84 can pass information to and from the programmable computer 86 while being used as a pointing device.

Typically, the programmable computer housing 90 makes physical contact with the computer mouse housing 88. In FIG. 7, the computer mouse housing 88 is adapted to receive the programmable computer housing 90. The programmable computer housing 90 fits into the saddle 92 in the computer mouse housing 88. Alternatively, the programmable computer housing 90 could slide into a compartment in the computer mouse housing 88. The two devices can have an electrical contact that connects when the two devices are connected together. Alternatively, a removable wire could connect the two devices.

The devices can also be coupled using a wireless communications link. In this case, the programmable computer housing 90 is positioned adjacent to the computer mouse housing 88 but the two devices do not have to make physical contact. The computer mouse 84 and the programmable computer 86 communicate using wireless techniques such as radio frequency or infrared signals.

This embodiment provides the functionality of the previous embodiments and a convenient interface between the programmable computer 86 and the computer 22. Using the computer mouse 84, the programmable computer 86 is easily connected to the computer 22. In addition, this embodiment provides a more conventional size computer mouse yet maintains the portability of the timekeeping and programmable computer component of the pointing device.

From the above, it can be seen that the disclosed invention provides an economical yet powerful computer pointing device and portable computer combination. While certain specific embodiments are disclosed as typical, the invention is not limited to the particular forms, but rather is applicable broadly to all such variations as fall within the scope of the appended claims. For example, the processor components could be configured using a variety of architectures and could be implemented on multiple microchips or combined on a single microchip. Various motions sensors, displays and data transmission techniques may be used. A variety of input devices could be substituted for the switches and keypad. The mechanical coupling between the watch and other components could be implemented in various ways. Thus, the specific structures discussed in detail above are merely illustrative of a few specific embodiments of the invention.

What is claimed is:

1. A portable computer pointing device for positioning a cursor on a display screen of a computer and displaying information stored in said pointing device, comprising:
    a sensor for generating a position signal;
    a first data port, coupleable to said computer and adapted to receive said position signal, wherein said first data port sends said position signal to said computer to position said cursor on said display screen;
    a first housing adapted to receive said sensor and said first data port, said first housing including a second data port for transferring data between said first data port and a third data port;
    a data memory for storing data that includes said information;
    a keypad for generating an input signal that includes information to be stored in said data memory;
    a processor, coupled to said data memory and said keypad, for processing said input signal to store data in said data memory, for accessing, modifying and replacing data previously stored in said data memory, and for processing said data stored in said data memory to generate a display signal;
    a display device, coupled to said processor, for displaying an image defined by said display signal; and
    a second housing adapted to receive said data memory, said keypad, said processor and said display device, said second housing including said third data port coupled to said second data port for transferring data between said data memory and said second data port.

2. A computer pointing device according to claim 1 further including an auxiliary data port for transferring data between said computer pointing device and an auxiliary device.

3. A computer pointing device according to claim 2, wherein said processor is programmed to control said auxiliary device.

4. A portable computer pointing device according to claim 1 wherein said second housing is adapted to be removably attached to a wristband.

5. A portable watch device, comprising:
    a sensor for generating a position signal corresponding to a position of a cursor;
    a data port, adapted to receive said position signal, wherein said data port sends said position signal to a computer to position said cursor on a display screen of said computer;
    a timekeeping circuit for calculating a time and generating signals representative of said time;
    a receiver for receiving first transmission signals that includes data from said computer;
    a data memory for storing said data;
    a processor, coupled to said data memory and said receiver, for processing said first transmission signals to store said data in said data memory, for accessing, modifying and replacing said data and for retrieving said data and generating a display signal and second transmission signals that includes said modified data;
    a transmitter for transmitting said second transmission signals to said computer; and
    a display device, coupled to said timekeeping circuit and said processor, for displaying an image defined by said signals representative of said time, said display signal and said second transmission signals.

6. A portable watch device according to claim 5 further including:
    a keypad for generating an input signal that includes data to be stored in said data memory and of data for modifying said modified data.

7. A portable watch device according to claim 5 wherein said transmitter includes said data port.

8. A portable watch device according to claim 5 wherein said receiver includes an optical receiver.

9. A portable watch device according to claim 5 wherein said sensor includes a track ball.

10. A portable watch device according to claim 5 wherein said sensor includes a pressure sensor.

11. A computer pointing device assembly for positioning a cursor on a display screen of a computer and displaying information stored in said pointing device, comprising:
    a first housing comprising:
        a sensor for generating a position signal corresponding to a position of said cursor;

a first data port, coupled to said computer and adapted to receive said position signal, wherein said first data port sends said position signal to said computer to position said cursor on said display screen; and
   a second data port for transferring data between said first data port and a third data port; and
a second housing comprising:
   a keypad for generating an input signal that includes said information;
   a data memory for storing data that includes said information;
   a processor, coupled to said data memory and said keypad, for processing said input signal to store data in said data memory, for accessing, modifying and replacing data previously stored in said data memory, and for processing said data stored in said data memory to generate a display signal; and
   a display device, coupled to said processor, for displaying an image in accordance with said display signal;
   wherein said third data port is coupled to said second data port for transferring data between said data memory and said second data port.

12. A computer pointing device assembly according to claim 11 further including a timekeeping circuit.

13. A computer pointing device assembly according to claim 12 wherein said timekeeping circuit generates said display signal to display a time on said display device.

14. A computer pointing device assembly according to claim 11 wherein said second housing is adapted to be removably attached to a wristband.

15. A computer pointing device assembly according to claim 11 wherein said second housing includes means for receiving and coupling to said first housing.

16. A computer pointing device assembly according to claim 11 wherein said first data port is adapted to send and receive data stored in said data memory to and from said computer.

* * * * *